United States Patent
Ling et al.

(10) Patent No.: US 10,967,870 B2
(45) Date of Patent: Apr. 6, 2021

(54) HILL DESCENT SYSTEM FOR VEHICLE AND CONTROL METHOD THEREOF

(71) Applicant: BYD COMPANY LIMITED, Guangdong (CN)

(72) Inventors: Heping Ling, Shenzhen (CN); Fanliang Meng, Shenzhen (CN); Mingchuan Shi, Shenzhen (CN); Yanfei Xiong, Shenzhen (CN); Weiqiang Chen, Shenzhen (CN)

(73) Assignee: BYD COMPANY LIMITED, Guangdong (CN)

(*) Notice: Subject to any disclaimer, the term of this patent is extended or adjusted under 35 U.S.C. 154(b) by 213 days.

(21) Appl. No.: 16/331,333

(22) PCT Filed: Aug. 25, 2017

(86) PCT No.: PCT/CN2017/099033
§ 371 (c)(1),
(2) Date: Mar. 7, 2019

(87) PCT Pub. No.: WO2018/045881
PCT Pub. Date: Mar. 15, 2018

(65) Prior Publication Data
US 2020/0031357 A1     Jan. 30, 2020

(30) Foreign Application Priority Data

Sep. 9, 2016    (CN) .......................... 201610812220.3

(51) Int. Cl.
*B60K 31/00*     (2006.01)
*B60W 30/18*     (2012.01)
(Continued)

(52) U.S. Cl.
CPC ......... *B60W 40/076* (2013.01); *B60K 7/0007* (2013.01); *B60W 30/18009* (2013.01);
(Continued)

(58) Field of Classification Search
CPC .......... B60K 31/00; B60K 31/04; B60K 7/00; B60W 10/04; B60W 10/18; B60W 30/18;
(Continued)

(56) References Cited

U.S. PATENT DOCUMENTS

2003/0033060 A1* 2/2003 Okoshi ................. B60W 20/10
  701/22
2012/0323430 A1* 12/2012 Nakamura .......... B60L 11/1803
  701/22
(Continued)

FOREIGN PATENT DOCUMENTS

CN    101253066 A    8/2008
CN    104442763 A    3/2015
(Continued)

OTHER PUBLICATIONS

English Translation of International Search Report from PCT/CN2017/099033 dated Nov. 30, 2017 (2 pages).

*Primary Examiner* — Tan Q Nguyen
(74) *Attorney, Agent, or Firm* — Calfee Halter & Griswold LLP

(57) ABSTRACT

A hill descent system for a vehicle and a control method thereof comprising: wheels; wheel speed sensors used for detecting the speeds of the wheels; motors used for selectively driving or braking the wheels; a motor controllers, for controlling the working states of the motors; resolver sensors for detecting the rotational speeds of the motors; and a vehicle control unit for determining the actual downhill speed of the vehicle and adjusting the working states of the motors to control the descent of the vehicle.

18 Claims, 3 Drawing Sheets

(51) Int. Cl.
*B60W 40/076* (2012.01)
*B60K 7/00* (2006.01)
*B60W 40/105* (2012.01)

(52) U.S. Cl.
CPC ... *B60W 40/105* (2013.01); *B60K 2007/0092* (2013.01); *B60W 2520/14* (2013.01); *B60W 2520/28* (2013.01)

(58) Field of Classification Search
CPC ... B60W 40/076; B60W 40/105; F02D 29/02; B60T 7/12
See application file for complete search history.

(56) References Cited

U.S. PATENT DOCUMENTS

2018/0244157 A1* 8/2018 Hirakawa ............... B60L 7/10
2018/0319397 A1* 11/2018 Ohta ................. B60W 30/14

FOREIGN PATENT DOCUMENTS

| CN | 103118909 B | 10/2015 |
| CN | 105691241 A | 6/2016 |
| DE | 3736807 A1 | 5/1989 |
| DE | 19954807 A1 | 5/2001 |
| DE | 10101012 A1 | 7/2002 |
| EP | 1212222 A1 | 6/2002 |

* cited by examiner

HILL DESCENT SYSTEM FOR VEHICLE AND CONTROL METHOD THEREOF

CROSS-REFERENCE TO RELATED APPLICATIONS

This application is the U.S. national phase entry of PCT Application No. PCT/CN2017/099033, filed Aug. 25, 2017, which is based upon and claims priority to Chinese Patent Application No. 201610812220.3, filed Sep. 9, 2016, the entire contents of which are incorporated herein by reference.

FIELD

The present disclosure relates to the technical field of vehicles and particularly relates to a hill descent system for a vehicle and a control method of the hill descent system.

BACKGROUND

In the related art, some hill descent systems are developed on the basis of an anti-lock braking system (ABS), but a hydraulic brake system has the disadvantages of low efficiency, slow response, high cost, etc. Moreover, the hill descent systems require repeated pressure brakes of a hydraulic pump, which will inevitably result in energy loss.

SUMMARY

The present disclosure resolves one of technical problems in related technologies at least to some extent. To this end, exemplary embodiments provide a hill descent system for a vehicle, which can cause the vehicle to go downhill in a straight line at a constant speed, and a motor which can brake the wheels quickly and accurately.

Exemplary embodiments further provide a control method of the hill descent system.

The hill descent system according to the exemplary embodiments comprises: a plurality of wheels; a plurality of wheel speed sensors, corresponding to the plurality of wheels and used for detecting the speeds of the plurality of wheels; a plurality of motors, corresponding to the plurality of wheels and used for selectively driving or braking the plurality of wheels; a plurality of motor controllers, respectively connected to the plurality of motors and used for controlling the working states of the plurality of motors; a plurality of resolver sensors, corresponding to the plurality of motors and used for detecting the rotational speeds of the plurality of motors; and a vehicle control unit, respectively connected to the plurality of wheel speed sensors, the plurality of motor controllers and the plurality of resolver sensors, and used for determining the actual downhill speed of the vehicle according to the speeds of the plurality of wheels and the rotational speeds of the plurality of motors, and controlling the plurality of motor controllers according to the actual downhill speed of the vehicle to adjust the working states of the plurality of motors.

According to the hill descent system of an exemplary embodiment, the vehicle control unit can determine the actual downhill speed of the vehicle according to the speeds of the wheels detected by the wheel speed sensor and the rotational speeds of the motors detected by the resolver sensors. Therefore, the motors can control the speeds of the wheels according to the actual downhill condition of the vehicle, thereby making the vehicle downhill speed slow and uniform, and improving the riding comfort of the vehicle in the downhill process. In addition, the motors brake quickly and accurately.

According to an exemplary embodiment of a control method for the hill descent system, the hill descent system is the hill descent system according to the exemplary embodiment, and the control method comprises: detecting the speeds of a plurality of wheels by a plurality of wheel speed sensors, and detecting the rotational speeds of the plurality of motors by a plurality of resolver sensors; acquiring the actual downhill speed of the vehicle by the vehicle control unit according to the speeds of the plurality of wheels and the rotational speeds of the plurality of motors; comparing the actual downhill speed of the vehicle with the predetermined speed, wherein the actual downhill speed of the vehicle is V1, and the predetermined speed of the vehicle is V0; when V1<V0, driving the plurality of wheels to rotate by the plurality of motors until V1=V0; and when V1>V0, braking the plurality of wheels by the plurality of motors until V1=V0.

According to the control method for the hill descent system of the exemplary embodiments, the vehicle control unit can determine the actual downhill speed of the vehicle according to the speeds of the wheels detected by the wheel speed sensors and the rotational speeds of the motors detected by the resolver sensors. Therefore, the motors can control the speeds of the wheels according to the actual downhill condition of the vehicle, thereby making the vehicle downhill speed slow and uniform, and improving the riding comfort of the vehicle in the downhill process. In addition, the motors brake quickly and accurately.

DETAILED DESCRIPTION

Figure 1:
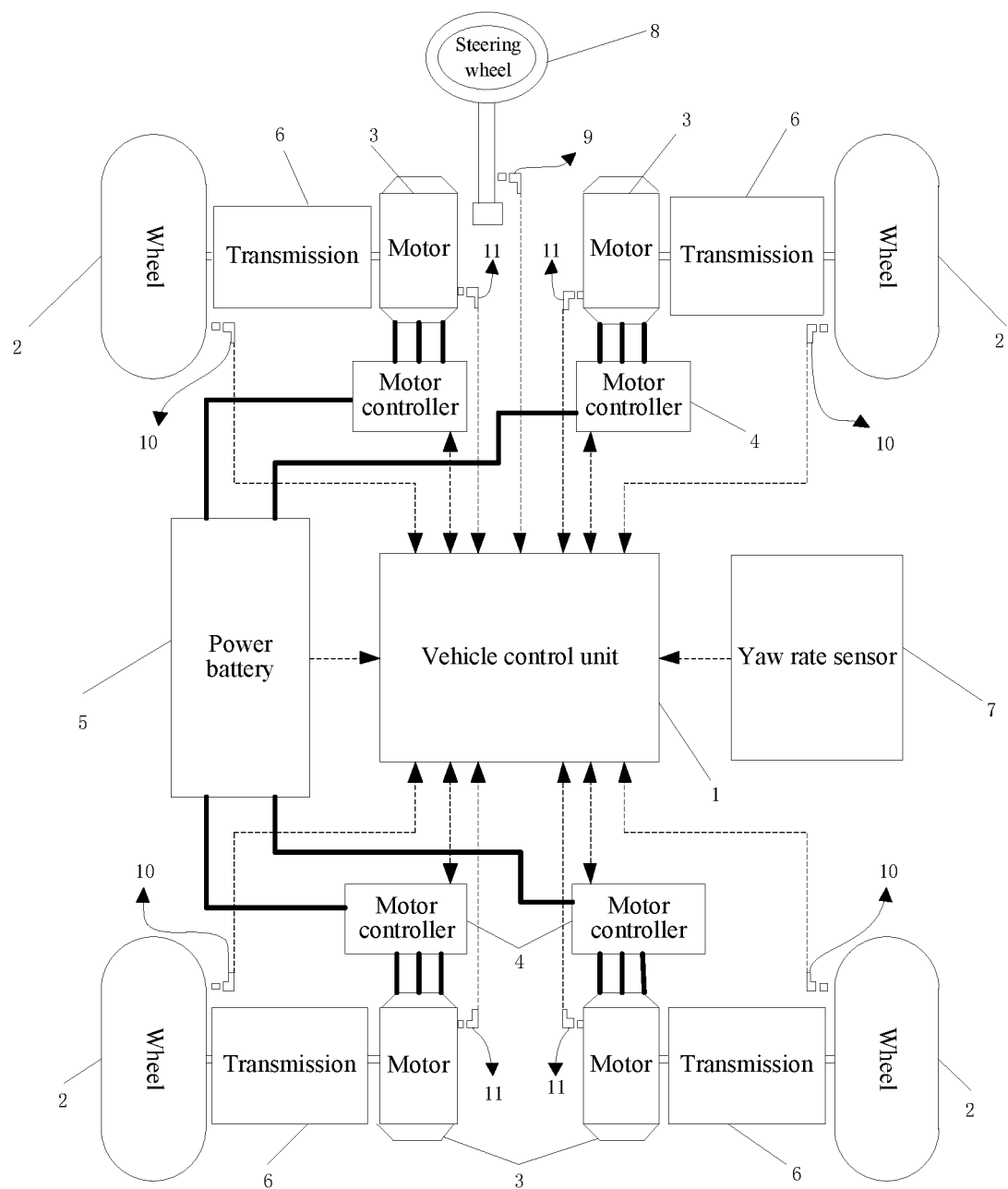
FIG. 1 is a schematic structural view of a hill descent system for a vehicle according to an exemplary embodiment.

Exemplary embodiments of the present disclosure are described in detail below. The exemplary embodiments are illustrated in the accompanying drawings. The embodiments described below with reference to the accompanying drawings are exemplary, and are used for explaining rather than limiting the present disclosure.

A hill descent system 100 according to exemplary will be described in detail below with reference to the accompanying drawings. The hill descent system 100 can be applied to a vehicle such that the vehicle travels at a constant speed during a downhill process, so that the riding smoothness of the vehicle during the downhill process is improved.

The hill descent system 100 according to the exemplary embodiments may comprise: a plurality of wheels 2, a plurality of wheel speed sensors 10, a plurality of motors 3, a plurality of motor controllers 4, a plurality of resolver sensors 11 and a vehicle control unit 1. The plurality of wheel speed sensors 10 correspond to the plurality of wheels 2, the plurality of motors 3 correspond to the plurality of wheels 2, and the plurality of motors 3 selectively drive and brake the plurality of wheels 2. It can be understood that the plurality of motors 3 can selectively drive the wheels 2 to rotate according to actual conditions, or the plurality of motors 3 can selectively brake the wheels 2 according to actual conditions.

The plurality of motor controllers 4 are respectively connected to the plurality of motors 3, and the motor controllers 4 can control the working states of the motors 3, such as forward or reverse rotation of the motors 3, and the rotational speeds of the motors 3, etc. The plurality of resolver sensors 11 correspond to the plurality of motors 3, and the vehicle control unit 1 is connected to the plurality of wheel speed sensors 10, the plurality of motor controllers 4, and the plurality of resolver sensors 11 respectively.

For example, as shown in FIG. 1, the number of the wheel 2 may be four, and accordingly, the number of the wheel speed sensor 10 may be four. The four wheel speed sensors 10 respectively correspond to the four wheels 2, and each wheel speed sensor 10 can be used for detecting the speed of the corresponding wheel 2, so that the speed of the vehicle in the downhill process can be acquired. The number of the motor 3 may be four, and the four motors 3 correspond to the four wheels 2. The number of the motor controller 4 may be four, and the four motor controllers 4 can be in one-to-one correspondence with the four motors 3. The four resolver sensors 11 can be in one-to-one correspondence with the four motors 3, and the four resolver sensors 11 can be used for detecting the rotational speeds of the four motors 3 respectively, thereby acquiring the speed of the vehicle in the downhill process. The speed of the vehicle acquired according to the speeds of the wheels 2 and the speed of the vehicle acquired according to the rotational speeds of the motors 3 are mutually verified, thereby acquiring the final speed of the vehicle. Further, as shown in FIG. 1, transmissions 6 can be connected to the motor shafts of the plurality of motors 3, and the transmissions 6 can adjust the output rotational speeds of the motors 3, so that the output rotational speeds of the motors 3 can be made appropriate, and further the motors 3 can drive or brake the wheels 2 appropriately and reliably. The vehicle control unit 1 can be connected to the four wheel speed sensors 10, the four motor controllers 4 and the four resolver sensors 11, respectively.

Thus, the vehicle control unit 1 can determine the actual downhill speed of the vehicle according to the speeds of the wheels detected by the wheel speed sensors 10 and the rotational speeds of the motors detected by the resolver sensors 11. Therefore, the motors 3 can control the speeds of the wheels 2 according to the actual downhill condition of the vehicle, thereby making the vehicle downhill speed slow and uniform, and improving the riding comfort of the vehicle in the downhill process. In the above process, the motors 3 brake quickly and accurately.

For example, the predetermined speed of the vehicle is V0, and when the actual downhill speed V1 of the vehicle is less than the predetermined speed V0, the motors 3 can drive the wheels 2 to rotate until V1=V0; and when the actual downhill speed V1 of the vehicle is greater than the predetermined speed V0, the motors 3 can brake the wheels 2 until V1=V0. Thereby, in the downhill process of the vehicle, the vehicle can travel at a constant speed, so that the vehicle can be made smooth and slow downhill, and the riding comfort of the vehicle can be improved.

According to an exemplary embodiment, as shown in FIG. 1, the hill descent system 100 may further comprise a power battery 5 connected to the motor controllers 4, and the plurality of motors 3 are respectively motor generators. When the motors 3 are used as motor generators, the power battery 5 can supply electric power to the motors 3 through the motor controllers 4 to cause the motors 3 to drive or brake the wheels 2. When the motors 3 are used as generators, the wheels can reverse drive the motors 3, the motors 3 can collect the reverse-driving energy and generate electricity, and the electric energy generated by the motors 3 is stored in the power battery 5, thereby, the energy recovery efficiency of the vehicle can be improved, and the mileage of the vehicle can be extended.

In some exemplary embodiments, the plurality of motors 3 can be in-wheel motors respectively. The in-wheel motors are simple to arrange and the in-wheel motors are close to the wheels 2, which makes the arrangement of the hill descent system 100 appropriate.

It shall be illustrated that in a further exemplary embodiment, the hill descent system 100 may further comprise a hydraulic brake system connected to the vehicle control unit 1. In the process when the motors 3 brake the wheels 2, when the gradient of the ramp is small, the braking moment provided by the motors 3 for the wheels 2 may be sufficient to cause the vehicle to descend at a constant predetermined speed V0; and when the gradient of the ramp is large, the maximum braking moment provided by the motors 3 for the wheels 2 is less than the total braking moment required for the vehicle to reach or maintain the predetermined speed V0, and the hydraulic brake system brakes the plurality of wheels 2 under the control of the vehicle control unit 1 to maintain the vehicle at the predetermined speed V0, that is, the hydraulic brake system brakes the wheels 2 together with the motors 3, so that the vehicle travels at a constant speed in the downhill process.

According to an exemplary embodiment as shown in FIG. 1, the hill descent system 100 may further comprise: a steering wheel angle sensor 9 and a yaw rate sensor 7. The steering wheel angle sensor 9 and the yaw rate sensor 7 are respectively connected to the vehicle control unit 1, and the vehicle control unit 1 selectively controls the torque distribution of the plurality of motor controllers 4 to the plurality of motors 3 according to the detection results of the steering wheel angle sensor 9 and the yaw rate sensor 7, thereby performing control of the correction yaw moment. For example, four motors 3 can drive or brake the four wheels 2 to rotate at different speeds. Specifically, two of the four motors 3 drive the wheels 2 on the one side and the other two drive the wheels 2 on the other side.

During the hill descent, there may be a situation where the vehicle cannot go downhill in a straight line at a constant speed due to uneven road surface. A driver can turn a steering wheel 8 to control the vehicle to go straight down at a constant speed. Of course, the present disclosure is not limited thereto, and the steering wheel angle sensor 9 can be used for detecting the rotation angle of the steering wheel 8, so that the vehicle control unit 1 can determine whether the driver turns the steering wheel 8 according to the rotation angle of the steering wheel 8. When the vehicle control unit 1 determines that the driver does not turn the steering wheel 8, the vehicle control unit 1 can also determine the lateral swing state of the vehicle according to the yaw rate sensor 7. Therefore, the motor controllers 4 can appropriately distribute certain torque to the motors 3, further the yaw moment can be corrected, so that the vehicle can go downhill at a constant speed.

In an exemplary embodiment the speed difference between the yaw rate calculated by the vehicle control unit 1 and the yaw rate measured by the yaw rate sensor 7 is $\Delta\psi$, the sideslip angle of the vehicle estimated by a whole vehicle model is $\Delta\beta$, a predetermined yaw rate difference threshold value $\psi$ and a sideslip angle threshold value $\beta$ are set for the hill descent system 100. The steering wheel angle sensor 9 detects that when the driver does not operate the steering wheel 8, and Δψ>ψ or Δβ>β, the torques of the motors 3 are distributed by the motor controllers 4 to perform control of the correction yaw moment. The yaw rate sensor 7 may have the function of detecting the yaw rate, the longitudinal acceleration, and the lateral acceleration of the vehicle.

The calculation process of the yaw moment will be described below with reference to FIG. 3.

Figure 3:
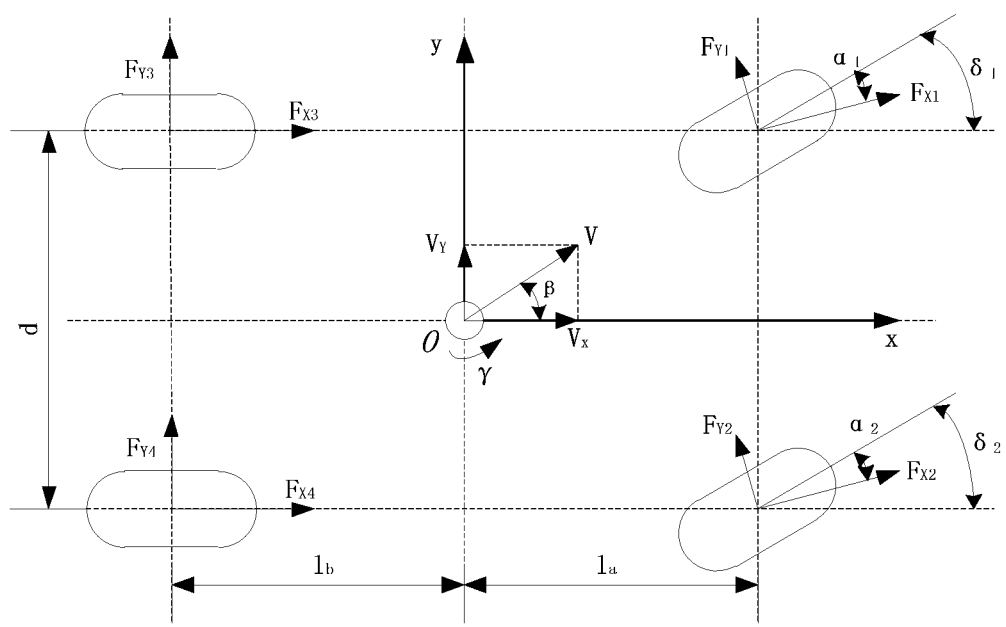
FIG. 3 is a schematic illustration of a dynamic model of a vehicle.

For ease of explanation, the whole vehicle is simplified into a linear two-degree-of-freedom whole vehicle model (as shown in FIG. 3). In the analysis, the influence of a steering system is ignored, and the front wheel angle is directly regarded as the input; the effect of a suspension is ignored, the vehicle compartment is considered only to move in a plane parallel to the ground, that is, the displacement of the vehicle along a z-axis, the pitch angle around a y-axis, and the roll angle around an x-axis are zero; the cornering characteristics of the tires and the effect of aerodynamic force are not considered; and the longitudinal speed of the vehicle along the x-axis is considered constant.

In FIG. 3, O is a vehicle centroid point; β is a sideslip angle; $\gamma$ is yaw rate; $\delta_i$ is a front wheel angle; $F_{Xi}$ is longitudinal force of a tire; $F_{Yi}$ is lateral force of a tire; d is wheel track; $l_a$ and $l_b$ are respectively the distances from the centroid point to the front and rear axles; $V_X$, $V_Y$ are the longitudinal and lateral speed of the vehicle body in a fixed coordinate system.

Its dynamic equation is expressed as follows:

$$\beta = \arctan\left(\frac{V_Y}{V_x}\right) \quad (1)$$

$$mV_X(\dot{\beta} + \gamma) = F_{Y1} + F_{Y2} + F_{Y3} + F_{Y4} \quad (2)$$

$$I_z\dot{\gamma} = l_a(F_{Y1} + F_{Y2}) - l_b(F_{Y3} + F_{Y4}) + M_z \quad (3)$$

In the formula, $m$ is the mass of the whole vehicle; $I_z$ is the moment of inertia of the vehicle around the z-axis; $M_z$ the centroid point of the vehicle, which is generated by the longitudinal driving force of each wheel 2, namely:

$$M_z = \frac{d}{2}(F_{X2} - F_{X1} + F_{X4} - F_{X3}) \quad (4)$$

The goal of stability control is to keep $\beta$ as small as possible (near zero), and at the same time, enable $\gamma$ track the expected value to achieve the driver's intention.

According to the steady-state steering theory of two-degree-of-freedom vehicles, the expected yaw rate can be expressed as:

$$\gamma_e = \frac{v}{(l_a + l_b) + Kv^2} \quad (5)$$

$$\gamma_e = \frac{v}{(l_a + l_b) + Kv^2}$$

In the formula, $\gamma_e$ is the expected yaw rate; $K_K$ is the stability factor.

Sliding mode control is taken as an example to illustrate the calculation method of the yaw moment. Using combined control of sideslip angle and yaw rate, a sliding mode surface is defined as:

$$S = c\beta + \dot{\beta} = 0, \; c > 0 \quad (6)$$

In the formula, c is a combination control parameter. Known from formula (2), and $\dot{\beta}\beta$ is a function of $\gamma\gamma$, so formula (6) is named as combination control of β and γβ 和 γ. According to the arrival condition: $\dot{S} + kS = 0$ (k>0), the following is acquired:

$$\ddot{\beta} = -(k+c)\dot{\beta} - kc\beta \quad (6)$$

equations (1) and (7) are substituted into equation (2) to acquire $$\dot{\gamma} = d\left(\frac{F_{Y1} + F_{Y2} + F_{Y3} + F_{Y4}}{mV_x}\right)\frac{1}{dt} + (k+c)\dot{\beta} + kc\beta \quad (8)$$

Therefore, the expression of the additional yaw moment with β and γ as the control variables is:

$$M_z = -(F_{Y1} + F_{Y2})l_a + (F_{Y3} + F_{Y4})l_b + I_z d\left(\frac{F_{Y1} + F_{Y2} + F_{Y3} + F_{Y4}}{mV_x}\right)\frac{1}{dt} + (k+c)I_z\dot{\beta} + kc\beta I_z \quad (9)$$

The calculation method of the yaw moment in the embodiments of the present disclosure is not limited to the use of the sliding mode control, and other control methods such as PID (proportional-integral-differential) control may be employed as long as the yaw moment can be generated to stabilize the vehicle body.

It shall be illustrated that the vehicle control unit 1 is adapted to control the hydraulic brake system to brake the plurality of wheels 2 when the yaw moment generated by the plurality of motors 3 is less than the correction yaw moment required by the vehicle. In other words, the hydraulic control system and the plurality of motors 3 together provide a correction yaw moment that maintains the vehicle traveling in a straight line at a constant speed.

In addition, a hill descent control button may be arranged in the driving cabin of the vehicle, and the hill descent control button is connected to the vehicle control unit 1. When the vehicle is about to enter a downhill condition, the driver can press the hill descent control button, and the hill descent control button can be arranged on a dashboard or on a secondary dashboard.

Figure 2:
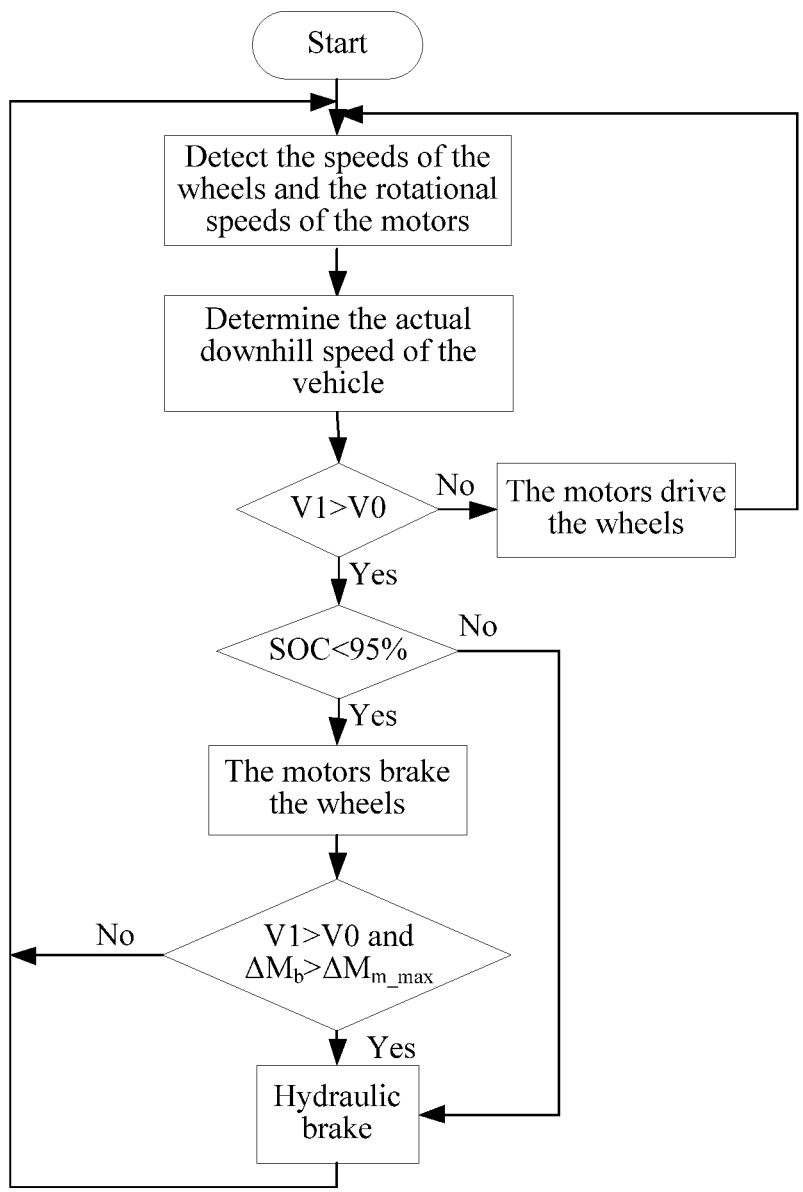
FIG. 2 is a flow chart of a control method for the hill descent system as shown in FIG. 1.

A control method for the hill descent system 100 according to the embodiments of the present disclosure will be described in detail below in combination with FIG. 2.

The control method for the hill descent system 100 according to the embodiments of the present disclosure may comprise the following steps: detecting the speeds of a plurality of wheels 2 by a plurality of wheel speed sensors 10, and detecting the rotational speeds of a plurality of motors 3 by a plurality of resolver sensors 11; acquiring the actual downhill speed V1 of the vehicle by the vehicle control unit 1 according to the speeds of the plurality of wheels 2 and the rotational speeds of the plurality of motors 3; comparing the actual downhill speed V1 of the vehicle with the predetermined speed V0; when V1<V0, driving the plurality of wheels 2 by the plurality of motors 3 to rotate until V1=V0; and when V1>V0, braking the plurality of wheels 2 by the plurality of motors 3 until V1=V0.

As shown in FIG. 1, the hill descent system 100 may further comprise a power battery 5 connected to motor controllers 4, the state of charge of the power battery 5 is SOC, and the motors 3 can be motor generators. The control method according to the embodiments of the present disclosure further comprises the step of braking the wheels 2 by the motors 3 when the actual downhill speed V1 of the vehicle is greater than the predetermined speed V0 and the state of charge (SOC) of the power battery 5 is less than 95%. It can be understood that when the SOC of the power battery 5 is less than 95%, the motors 3 brake the wheels 2, and the wheels 2 reverse drive the motors 3. Thereby, the motors 3 can be used as generators to convert the reverse-driving energy into electrical energy, and the electrical energy is stored in the power battery 5.

In a further exemplary embodiment, the hill descent system 100 may further comprise a hydraulic brake system. The control method according to the embodiments of the present disclosure further comprises a step of braking the plurality of wheels 2 by the hydraulic brake system when V1>V0 and SOC≥95%. At this time, since the amount of electric power in the power battery 5 is sufficient, and the power battery 5 does not need the motors 3 to generate electricity to charge it, so the hydraulic brake system can be used to brake the plurality of wheels 2 such that the actual downhill speed of the vehicle is maintained at the predetermined speed V0.

In the above-described exemplary embodiments of the present disclosure, the total braking moment required for the vehicle to maintain the predetermined speed V0 during hill descent is ΔMb, and the maximum braking moment provided by the plurality of motors 3 is ΔMm_max. Therefore, in the process when the motors 3 brake the wheels 2, when the actual downhill speed V1 of the vehicle is greater than the predetermined speed V0 and the total braking moment ΔMb is greater than the maximum braking moment ΔMm_max, that is, when the maximum braking moment of the plurality of motors 3 is smaller than the total braking moment required for the vehicle to maintain the predetermined speed V0, the plurality of motors 3 and the hydraulic brake system can brake the wheels 2 together. This makes it possible for the vehicle to continue to descend at a constant predetermined speed V0, so that the downhill riding comfort of the vehicle can be improved.

Further, the hill descent system 100 may further comprise: a steering wheel angle sensor 9 and a yaw rate sensor 7. The steering wheel angle sensor 9 and the yaw rate sensor 7 are respectively connected to the vehicle control unit 1, the speed difference between the yaw rate calculated by the vehicle control unit 1 and the yaw rate measured by the yaw rate sensor 7 is Δψ, the sideslip angle of the vehicle estimated by a whole vehicle model is Δβ, and a predetermined yaw rate difference threshold value ψ and a sideslip angle threshold value β are set for the hill descent system 100. The steering wheel angle sensor 9 detects that a driver does not operate the steering wheel 8, and when Δψ>ψ or Δβ>β, the torques of the motors 3 are distributed by the motor controllers 4 to perform control of the correction yaw moment. It can be understood that when the driver does not operate the steering wheel 8, the vehicle can enter an active yaw moment control mode, which can better control the vehicle to go downhill in a straight line at a constant speed, thereby improving the riding comfort of the vehicle.

In the descriptions of this specification, descriptions of reference terms "one embodiment", "an exemplary embodiment", "some embodiments", "an example", "a specific example", or "some examples" are intended to indicate that particular features, structures, materials, or characteristics described with reference to the embodiment or example are included in at least one embodiment or example of the present disclosure. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, a person skilled in the art can combine or group different embodiments or examples that are described in this specification and features of the different embodiments or examples.

Although the exemplary embodiments of the present disclosure are shown and described above, it may be understood that the foregoing embodiments are examples, and cannot be understood as limitations to the present disclosure. A person of ordinary skill in the art may make changes, modifications, replacements, and variations to the foregoing embodiments without departing from the scope of the present disclosure.

What is claimed is:

1. A hill descent system for a vehicle, comprising:
a plurality of wheels;
a plurality of wheel speed sensors, corresponding to the plurality of wheels and used for detecting the speeds of the plurality of wheels;
a plurality of motors, corresponding to the plurality of wheels and used for selectively driving or braking the plurality of wheels;
a plurality of motor controllers, respectively connected to the plurality of motors and used for controlling the working states of the plurality of motors;
a plurality of resolver sensors, corresponding to the plurality of motors and used for detecting the rotational speeds of the plurality of motors; and
a vehicle control unit, respectively connected to the plurality of wheel speed sensors, the plurality of motor controllers and the plurality of resolver sensors, and used for determining the actual downhill speed of the vehicle based on the speeds of the plurality of wheels and the rotational speeds of the plurality of motors, and controlling the plurality of motor controllers according to the actual downhill speed of the vehicle to adjust the working states of the plurality of motors.

2. The hill descent system according to claim 1, wherein the predetermined speed of the vehicle is V0, and the actual downhill speed of the vehicle is V1,
when V1<V0, the plurality of motors are used for driving the plurality of wheels to rotate until V1=V0;
when V1>V0, the plurality of motors are used for braking the plurality of wheels until V1=V0.

3. The hill descent system according to claim 2, further comprising: a power battery, wherein the power battery is connected to the plurality of motor controllers, a state of charge of the power battery is SOC, and the plurality of motors are respectively motor generators, when V1>V0 and SOC<95%, the plurality of motors are used for braking the plurality of wheels.

4. The hill descent system according to claim 3, also comprising a hydraulic brake system, when V1>V0 and SOC≥95%, the hydraulic brake system is used for braking the plurality of wheels.

5. The hill descent system according to claim 3, also comprising a hydraulic brake system, wherein the hydraulic brake system is connected to the vehicle control unit and adapted to, in a process when the plurality of motors brake the plurality of wheels, brake the plurality of wheels when a total braking moment required for the vehicle to maintain the predetermined speed is greater than a maximum braking moment of the plurality of motors.

6. The hill descent system according to claim 2, also comprising a hydraulic brake system, wherein the hydraulic brake system is connected to the vehicle control unit and adapted to, in a process when the plurality of motors brake the plurality of wheels, brake the plurality of wheels when a total braking moment required for the vehicle to maintain the predetermined speed is greater than a maximum braking moment of the plurality of motors.

7. The hill descent system according to claim 1, wherein the plurality of motors are respectively in-wheel motors.

8. The hill descent system according to claim 1, wherein transmissions are connected to the motor shafts of the plurality of motors.

9. The hill descent system according to claim 1, further comprising: a steering wheel angle sensor and a yaw rate sensor, wherein the steering wheel angle sensor and the yaw rate sensor are respectively connected to the vehicle control unit, and the vehicle control unit selectively controls torque distribution of the plurality of motor controllers to the plurality of motors according to detection results of the steering wheel angle sensor and the yaw rate sensor, thereby performing control of the correction yaw moment.

10. The hill descent system according to claim 9, wherein the speed difference between a yaw rate calculated by the vehicle control unit and a yaw rate measured by the yaw rate sensor is $\Delta\psi$, the sideslip angle of the vehicle estimated by a whole vehicle model is $\Delta\beta$, a predetermined yaw rate difference threshold value $\psi$ and a sideslip angle threshold value $\beta$ are set for the hill descent system, and the steering wheel angle sensor detects that when a driver does not operate the steering wheel, and $\Delta\psi>\psi$ or $\Delta\beta>\beta$, the torques of the plurality of motors are distributed by the plurality of motor controllers to perform control of the correction yaw moment.

11. The hill descent system according to claim 10, also comprising a hydraulic brake system, wherein the hydraulic brake system is connected to the vehicle control unit, and the vehicle control unit is adapted to control the hydraulic brake system to brake the plurality of wheels when a yaw moment generated by the plurality of motors is smaller than a correction yaw moment required by the vehicle.

12. The hill descent system according to claim 1, wherein a hill descent control button is arranged in the driving cabin of the vehicle, and the hill descent control button is connected to the vehicle control unit.

13. A control method for the hill descent system according to claim 1, comprising:

detecting the speeds of a plurality of wheels by a plurality of wheel speed sensors, and detecting the rotational speeds of the plurality of motors by a plurality of resolver sensors;

acquiring the actual downhill speed of the vehicle by the vehicle control unit according to the speeds of the plurality of wheels and the rotational speeds of the plurality of motors;

comparing the actual downhill speed of the vehicle with the predetermined speed, wherein the actual downhill speed of the vehicle is V1, and the predetermined speed of the vehicle is V0;

when V1<V0, driving the plurality of wheels to rotate by a plurality of motors until V1=V0; and when V1>V0, braking the plurality of wheels by the plurality of motors until V1=V0.

14. The control method according to claim 13, wherein the hill descent system further comprises a power battery, the power battery is connected to the plurality of motor controllers, the state of charge of the power battery is SOC, and the plurality of motors are motor generators; and the control method further comprises: when V1>V0 and SOC<95%, braking the plurality of wheels by the plurality of motors.

15. The control method according to claim 14, wherein the hill descent system further comprises: a hydraulic brake system; and the control method further comprises: when V1>V0 and SOC≥95%, braking the plurality of wheels by the hydraulic brake system.

16. The control method according to claim 14, wherein the hill descent system further comprises: a hydraulic brake system, the total braking moment required for the vehicle to maintain the predetermined speed during hill descent is $\Delta Mb$, and the maximum braking moment provided by the plurality of motors is $\Delta Mm\_max$, the control method further comprises: in a process when the plurality of motors brake the plurality of wheels, when V1>V0 and $\Delta Mb>\Delta Mm\_max$, braking the plurality of wheels by the plurality of motors and the hydraulic brake system together.

17. The control method according to claim 13, wherein the hill descent system further comprises: a hydraulic brake system, the total braking moment required for the vehicle to maintain the predetermined speed during hill descent is $\Delta Mb$, and the maximum braking moment provided by the plurality of motors is $\Delta Mm\_max$, the control method further comprises: in a process when the plurality of motors brake the plurality of wheels, when V1>V0 and $\Delta Mb>\Delta Mm\_max$, braking the plurality of wheels by the plurality of motors and the hydraulic brake system together.

18. The control method according to claim 13, wherein the hill descent system further comprises: a steering wheel angle sensor and a yaw rate sensor, and the steering wheel angle sensor and the yaw rate sensor are respectively connected to the vehicle control unit, the speed difference between the yaw rate calculated by the vehicle control unit and the yaw rate measured by the yaw rate sensor is $\Delta\psi$, the sideslip angle of the vehicle estimated by a whole vehicle model is $\Delta\beta$, and a predetermined yaw rate difference threshold value $\psi$ and a sideslip angle threshold value $\beta$ are set for the hill descent system, the control method further comprises: detecting, when the steering wheel angle sensor, that a driver does not operate the steering wheel, and $\Delta\psi>\psi$ or $\Delta\beta>\beta$, distributing the torques of the plurality of motors by the plurality of motor controllers to perform control of the correction yaw moment.

\* \* \* \* \*